(12) United States Patent
Klassen et al.

(10) Patent No.: US 7,743,486 B1
(45) Date of Patent: Jun. 29, 2010

(54) METHOD FOR ASSEMBLING A HEAD STACK ASSEMBLY WITH A DISK DRIVE BASE UTILIZING A TOOLING MANDREL

(75) Inventors: Andrew S. Klassen, San Jose, CA (US); Joselito S. Jose, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/470,345

(22) Filed: May 21, 2009

Related U.S. Application Data

(62) Division of application No. 11/034,002, filed on Jan. 12, 2005, now Pat. No. 7,552,526.

(51) Int. Cl.
G11B 5/127 (2006.01)
H04R 31/00 (2006.01)

(52) U.S. Cl. ............... 29/603.03; 29/603.04; 29/603.07; 29/729; 360/244.2; 360/244.5; 360/245.2; 360/265.7; 360/265.9

(58) Field of Classification Search .............. 29/603.03, 29/603.04, 603.06, 603.07, 729; 360/244.2, 360/244.5, 245.2, 265.7, 265.9
See application file for complete search history.

(56) References Cited

U.S. PATENT DOCUMENTS

| | | | |
|---|---|---|---|
| 3,200,483 A | 8/1965 | Menegoni | |
| 3,588,983 A | 6/1971 | Hoy | |
| 4,573,378 A | 3/1986 | McDonald | |
| 5,520,704 A | 5/1996 | Castro et al. | |
| 6,085,410 A | 7/2000 | Toensing et al. | |
| 6,382,413 B1 | 5/2002 | Nakamura et al. | |
| 6,571,591 B2* | 6/2003 | Itaya | ........................... 72/137 |
| 7,490,398 B1* | 2/2009 | Klassen et al. | ........... 29/603.04 |
| 7,552,526 B1 | 6/2009 | Klassen et al. | |
| 2003/0002400 A1 | 1/2003 | Klein | |

FOREIGN PATENT DOCUMENTS

JP           55068660 A           5/1980

OTHER PUBLICATIONS

U.S. Appl. No. 11/034,002 to Andrew S. Klassen, et al., filed Jan. 12, 2005, 23 pages.
Office Action dated Apr. 9, 2007 from U.S. Appl. No. 11/034,002, 5 pages.

(Continued)

*Primary Examiner*—Paul D Kim

(57) ABSTRACT

A method for assembling a head stack assembly with a disk drive base utilizing a tooling mandrel is described. The head stack assembly includes a pivot bearing cartridge with a shaft and a sleeve. The shaft includes a shaft first end with an engagement feature. The shaft defines an axis of rotation and a shaft outer circumferential surface. The sleeve defines a sleeve inner circumferential surface disposed towards the shaft outer circumferential surface. The tooling mandrel includes a retainer element defining a longitudinal axis and including a distal end. The distal end engages the engagement feature. The tooling mandrel includes tooling fingers angularly fixed to the retainer element with respect to the longitudinal axis. The tooling fingers each include a tip portion. Each tip portion engages the pivot bearing cartridge through cooperative radial movement with respect to the axis of rotation with the distal end engaged with the engagement feature.

9 Claims, 7 Drawing Sheets

OTHER PUBLICATIONS

Office Action dated Jul. 26, 2007 from U.S. Appl. No. 11/034,002, 8 pages.
Office Action dated Feb. 13, 2008 from U.S. Appl. No. 11/034,002, 5 pages.
Office Action dated Jun. 23, 2008 from U.S. Appl. No. 11/034,002, 6 pages.
Office Action dated Sep. 24, 2008 from U.S. Appl. No. 11/034,002, 9 pages.
Notice of Allowance dated Feb. 24, 2009 from U.S. Appl. No. 11/034,002, 8 pages.

* cited by examiner

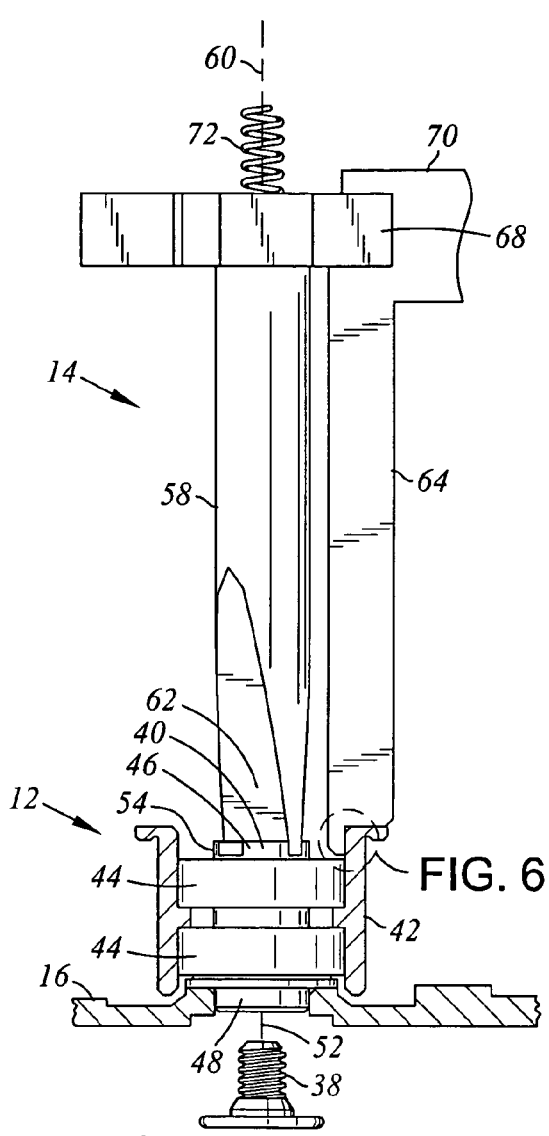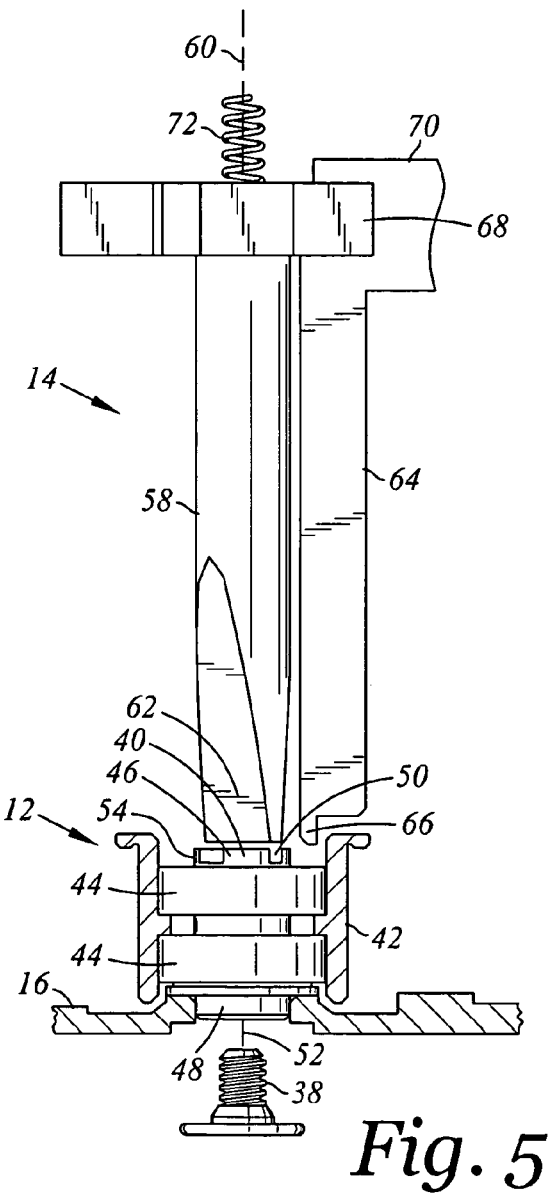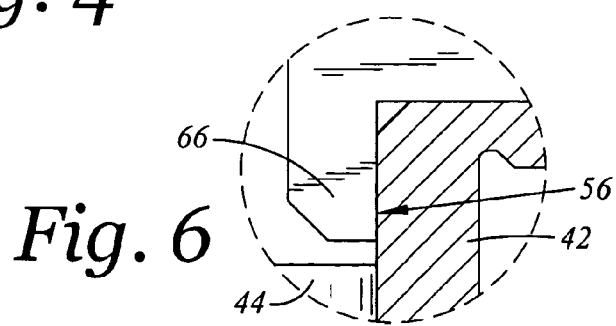

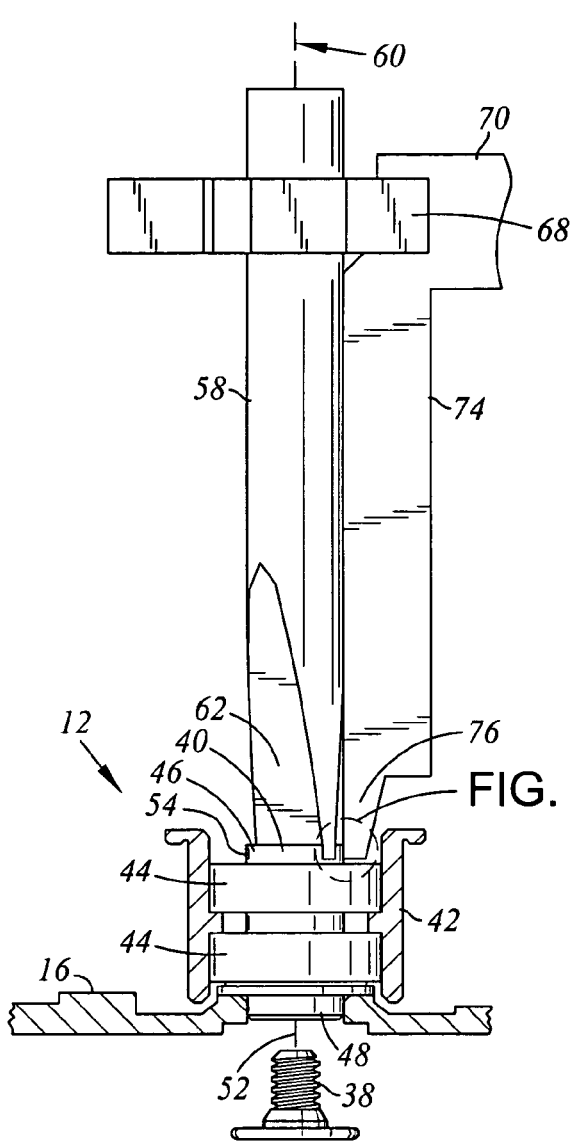
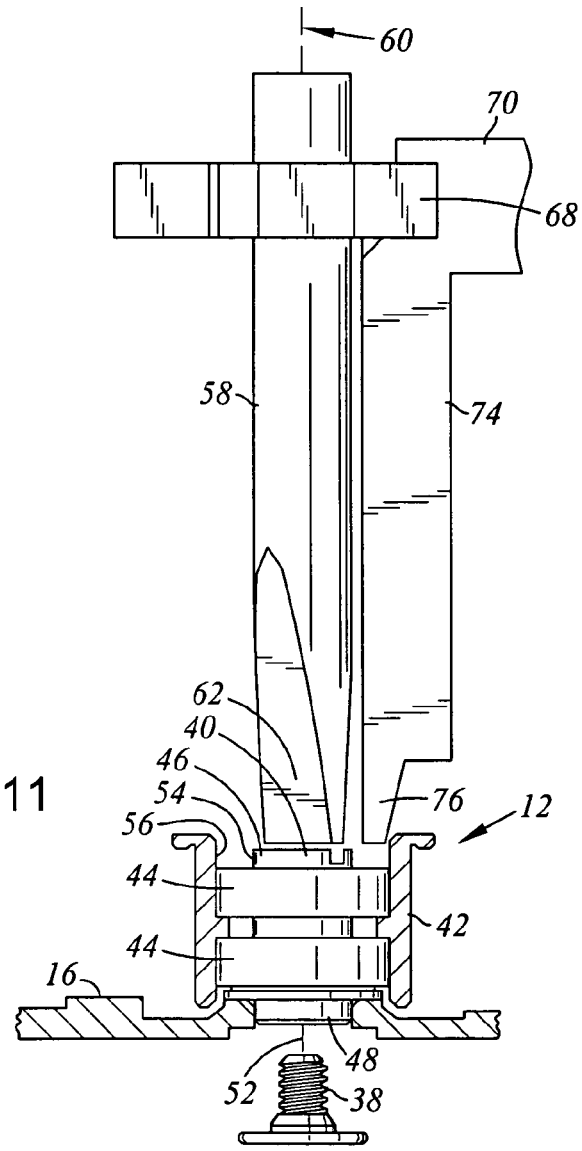
Fig. 9      Fig. 10
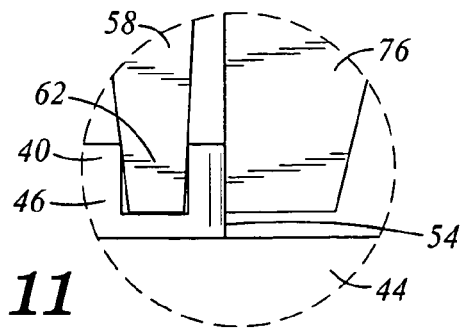
Fig. 11

METHOD FOR ASSEMBLING A HEAD STACK ASSEMBLY WITH A DISK DRIVE BASE UTILIZING A TOOLING MANDREL

CROSS-REFERENCE TO RELATED APPLICATIONS

This application is a divisional of U.S. patent application Ser. No. 11/034,002, filed Jan. 12, 2005, now U.S. Pat. No. 7,552,526, which is incorporated herein by reference in its entirety.

BACKGROUND OF THE INVENTION

1. Field of the Invention

The present invention relates generally to disk drives, and in particular to a tooling mandrel for assembling a head stack assembly with a disk drive base, and a method of using the same.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base.

The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to data tracks disposed upon the disk.

In further detail, the head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. The pivot assembly includes a pivot bearing cartridge that has a shaft, a sleeve disposed about the shaft, and bearings disposed there between. A coil support extends from one side of the actuator body, and a coil is supported by the coil support. The coil is configured to interact with one or more permanent magnets to form a voice coil motor. Energizing the coil results in forces that tend to pivot the actuator. A change in the direction of current through the coil results a change in the resulting pivot direction.

One or more actuator arms extend from an opposite side of the actuator body. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both surfaces along data annular regions. As such, the head stack assembly may be pivoted such that each transducer head is disposed adjacent the various data annular regions.

A topic of concern is the assembly process in regards to the head stack assembly. Installation of a head stack assembly with a disk drive base begins with a "pick and place" operation. This involves picking up a head stack assembly from its storage location and placing it upon a disk drive base at an assembly station. This may be done either manually or through the use of an automated device, such as a "pick and place" robotic armature.

The shaft of the pivot bearing cartridge may be slightly asymmetrical. Such slight asymmetrical nature may result in an axial run-out phenomenon that manifests itself as inconsistent performance from one disk drive to the next. As such, it is desirable to consistently install the head stack assemblies at a consistent angular disposition with respect to their respective disk drive bases. During installation, once the head stack assembly is disposed in the disk drive base, a separate tool may be used to orient the shaft at a predetermined angle. This may be done either manually or through the use of an automated device located at the assembly station. Finally, the head stack assembly is attached to the disk drive base. For example, a fastener may be used to attach the shaft of the pivot bearing cartridge to the disk drive base. This also may be done either manually or through the use of an automated device located at the assembly station.

As such, there is a need in the art for an improved method of assembling a head stack assembly with a disk drive base in comparison to the prior art.

SUMMARY OF THE INVENTION

According to an aspect of the present invention, there is a tooling mandrel for use in assembling a disk drive. The disk drive includes a disk drive base and a head stack assembly. The head stack assembly includes a pivot bearing cartridge. The pivot bearing cartridge includes a shaft and a sleeve disposed about the shaft. The shaft includes a shaft first end with an engagement feature. The shaft defines an axis of rotation and a shaft outer circumferential surface. The sleeve defines a sleeve inner circumferential surface disposed towards the shaft outer circumferential surface. The tooling mandrel includes a retainer element defining a longitudinal axis and including a distal end. The distal end is sized and configured to engage the engagement feature of the shaft first end with the longitudinal axis being aligned with the axis of rotation. The tooling mandrel further includes at least two tooling fingers disposed about the retainer element. The tooling fingers are angularly fixed to the retainer element with respect to the longitudinal axis. The tooling fingers each include a tip portion. Each tip portion is sized and configured to engage the pivot bearing cartridge through cooperative radial movement with respect to the axis of rotation with the distal end of the retainer element being engaged with the engagement feature of the shaft first end.

According to various embodiments, the at least two tooling fingers may include three tooling fingers. In an embodiment each tip portion may be sized and configured to engage the pivot bearing cartridge through engagement of the sleeve inner circumferential surface through cooperative radial movement away from the axis of rotation with the distal end of the retainer element being engaged with the engagement feature of the shaft first end. In another embodiment each tip portion is sized and configured to engage the pivot bearing cartridge through engagement of the shaft outer circumferential surface through cooperative radial movement towards the axis of rotation with the distal end of the retainer element being engaged with the engagement feature of the shaft first end. The engagement feature may be a slot and the distal end of the retainer element may be flat-head screwdriver shaped. The tooling fingers may be movable along the retainer element with respect to the longitudinal axis of the retainer element. The tooling mandrel may further include a biasing element in mechanical communication with the retainer element for biasing the retainer element in a direction along the longitudinal axis towards the distal end. The biasing element may be a spring.

According to another embodiment, there is provided a method of assembling a disk drive. The disk drive includes a disk drive base and a head stack assembly. The head stack assembly includes a pivot bearing cartridge. The pivot bearing cartridge includes a shaft and a sleeve disposed about the shaft. The shaft includes a shaft first end with an engagement feature. The shaft defining an axis of rotation and a shaft outer circumferential surface. The sleeve defines a sleeve inner circumferential surface disposed towards the shaft outer circumferential surface. The method includes the step of providing a tooling mandrel. The tooling mandrel includes a retainer element defining a longitudinal axis and including a distal end. The distal end is sized and configured to engage the engagement feature of the shaft first end with the longitudinal axis being aligned with the axis of rotation. The tooling mandrel further includes at least two tooling fingers disposed about the retainer element. The tooling fingers are angularly fixed to the retainer element with respect to the longitudinal axis. The tooling fingers each include a tip portion. Each tip portion is sized and configured to engage the pivot bearing cartridge through cooperative radial movement with respect to the axis of rotation with the distal end of the retainer element being engaged with the engagement feature of the shaft first end.

The method further includes a step of aligning the longitudinal axis of the retainer element with the axis of rotation of the shaft. The method further includes a step of engaging the engagement feature of the shaft first end with the distal end of the retainer element. The method further includes a step of engaging the pivot bearing cartridge with the tooling fingers through cooperative radial movement of the tip portions with respect to the axis of rotation. The method further includes a step of positioning the pivot bearing cartridge in mechanical communication with the disk drive base using the tooling fingers. The method further includes a step of attaching the pivot bearing cartridge to the disk drive base while maintaining engagement of the engagement feature of the shaft first end with the distal end of the retainer element and engagement of the pivot bearing cartridge with the tooling fingers.

According to various embodiments the sleeve inner circumferential surface is engaged with the tooling fingers through cooperative radial movement of the tip portions away from the axis of rotation. In an embodiment the shaft outer circumferential surface is engaged with the tooling fingers through cooperative radial movement of the tip portions towards the axis of rotation. The method may include moving the tooling fingers along the retainer element with respect to the longitudinal axis of the retainer element towards the shaft. The shaft may be oriented at a predefined angle about the axis of rotation with respect to the disk drive base by using the tooling mandrel. This may include rotating the tooling mandrel about the longitudinal axis of the retainer element until the shaft is disposed at a predefined angle about the axis of rotation with respect to the disk drive base. Such rotation may be performed prior to or after the pivot bearing cartridge is disposed in mechanical communication with the disk drive base. A fastener may be used to engage the shaft through the disk drive base.

BRIEF DESCRIPTION OF THE DRAWINGS

FIG. 4 is a cross-sectional side view of the pivot bearing cartridge as shown engaged with a portion of the tooling mandrel and a portion of a disk drive base and as shown with a fastener exploded from its installed position with the pivot bearing cartridge;

FIG. 5 is the cross-sectional side view of FIG. 4, however, as shown prior to the portion of the tooling mandrel being engaged with the pivot bearing cartridge;

FIG. 6 is an enlarged view of a portion indicated in FIG. 4 of a tooling finger of the tooling mandrel and a sleeve of the pivot bearing cartridge;

FIG. 9 is a cross-sectional side view similar to FIG. 4, however, with a tooling mandrel of another embodiment including a tooling finger engaged with a shaft of the pivot bearing cartridge;

FIG. 10 is the cross-sectional side view of FIG. 9, however, as shown prior to the portion of the tooling mandrel being engaged with the pivot bearing cartridge;

FIG. 11 is an enlarged view of a portion indicated in FIG. 9 of a portion of the tooling finger and a portion of a retainer element engaged with a portion of the shaft;

DESCRIPTION OF THE PREFERRED EMBODIMENTS

Figure 1:
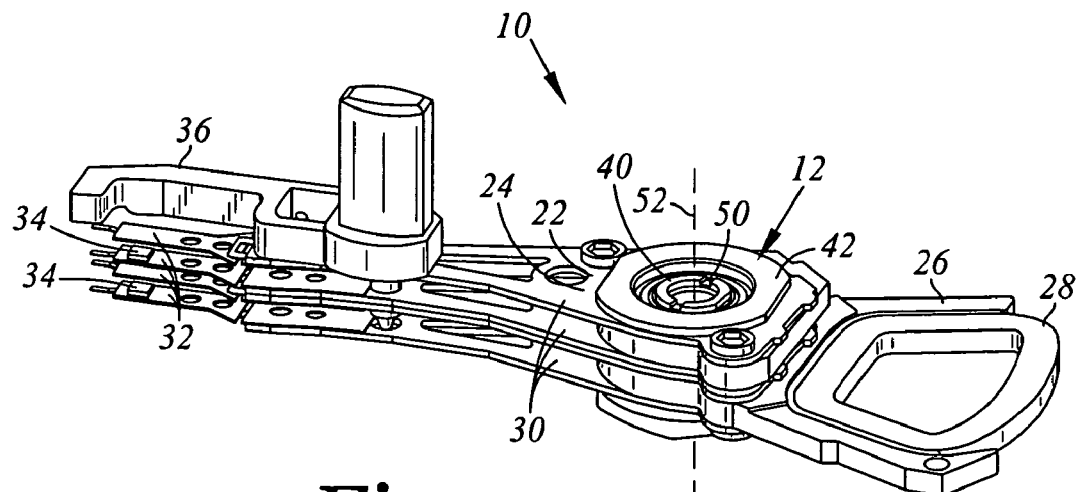
FIG. 1 is a perspective view of a head stack assembly including a pivot bearing cartridge.

Referring now to the drawings wherein the showings are for purposes of illustrating preferred embodiments of the present invention only, and not for purposes of limiting the same, FIGS. 1-14 illustrate a tooling mandrel in accordance with aspects of the present invention.

Figure 2:
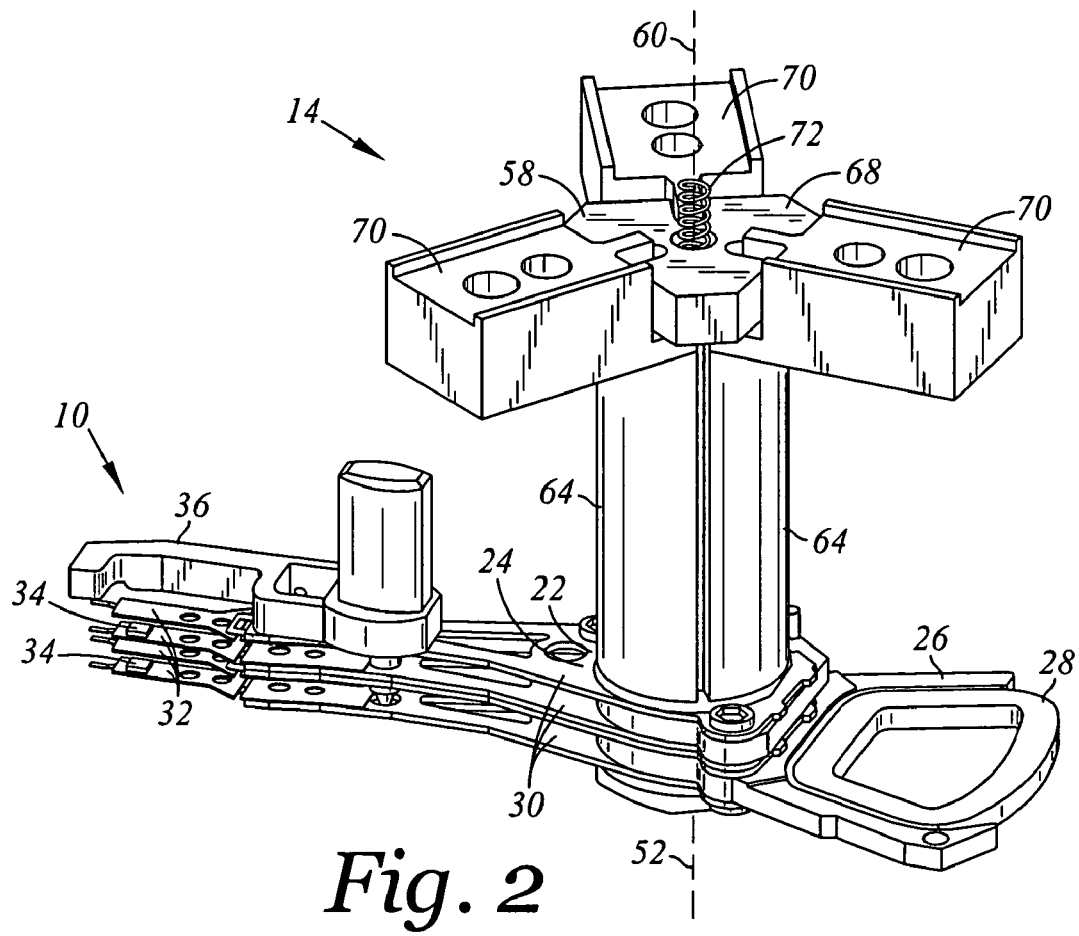
FIG. 2 is the perspective view of the head stack assembly of FIG. 1 engaged with a tooling mandrel.
Figure 12:
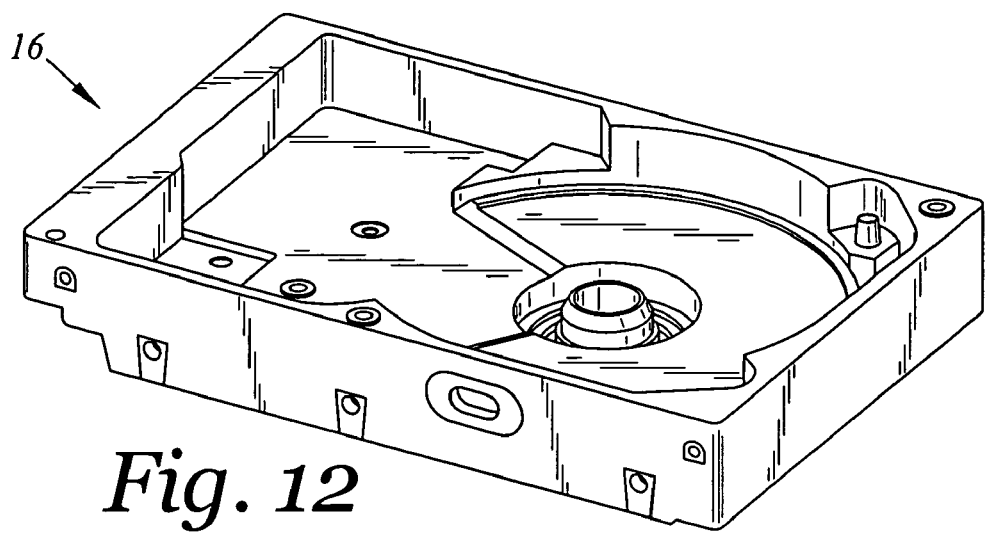
FIG. 12 is a perspective view of a disk drive base.
Figure 13:
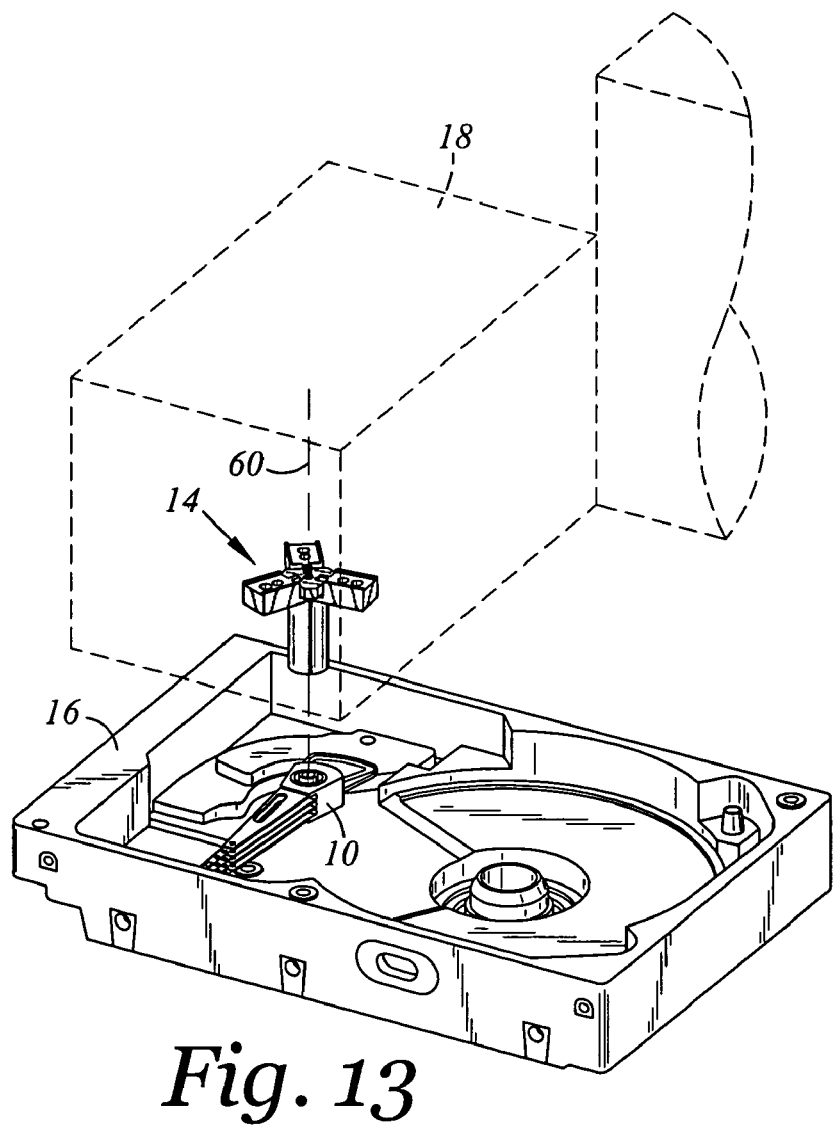
FIG. 13 is a perspective view of the disk drive base as attached with the head stack assembly and as shown with the tooling mandrel with an associated robotic armature (indicted in dashed line)

Referring now FIG. 1 there is depicted a perspective view of a head stack assembly 10 including a pivot bearing cartridge 12. FIG. 2 depicts a perspective view of the head stack assembly 10 engaged with a tooling mandrel 14. Referring additionally to FIG. 12 there is depicted a perspective view of a disk drive base 16. FIG. 13 is a perspective view of the disk drive base 16 as attached with the head stack assembly 10 and as shown with the tooling mandrel 14 with an associated robotic armature 18 (indicted in dashed line for ease of viewing).

Figure 14:
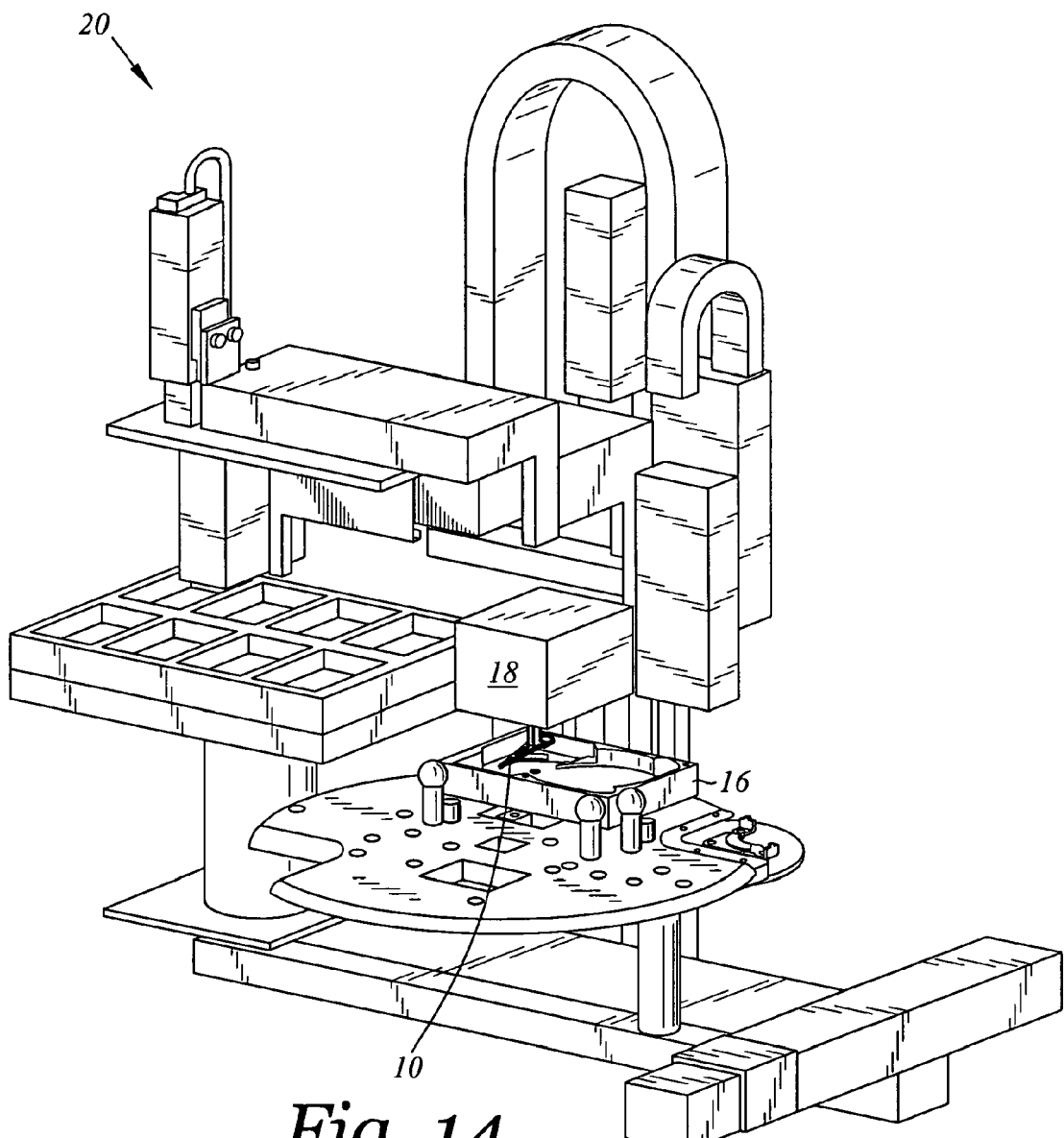
FIG. 14 is a perspective view of an assembly station as including the robotic armature with the tooling mandrel engaged with the head stack assembly being positioned near the disk drive base.

FIG. 14 depicts a perspective view of an assembly station 20 used for the assembly of a disk drive in accordance with aspects of the present invention. The assembly station 20 is configured to have access to various disk drive components. As is seen, the disk drive base 16 is initially nested within the assembly station 20. The assembly station 20 includes the robotic armature 18 which may be used for the assembly of the disk drive. The robotic armature 18 is shown with its tooling mandrel 14 engaged with the head stack assembly 10 prior to installation with the disk drive base 16.

Figure 3:
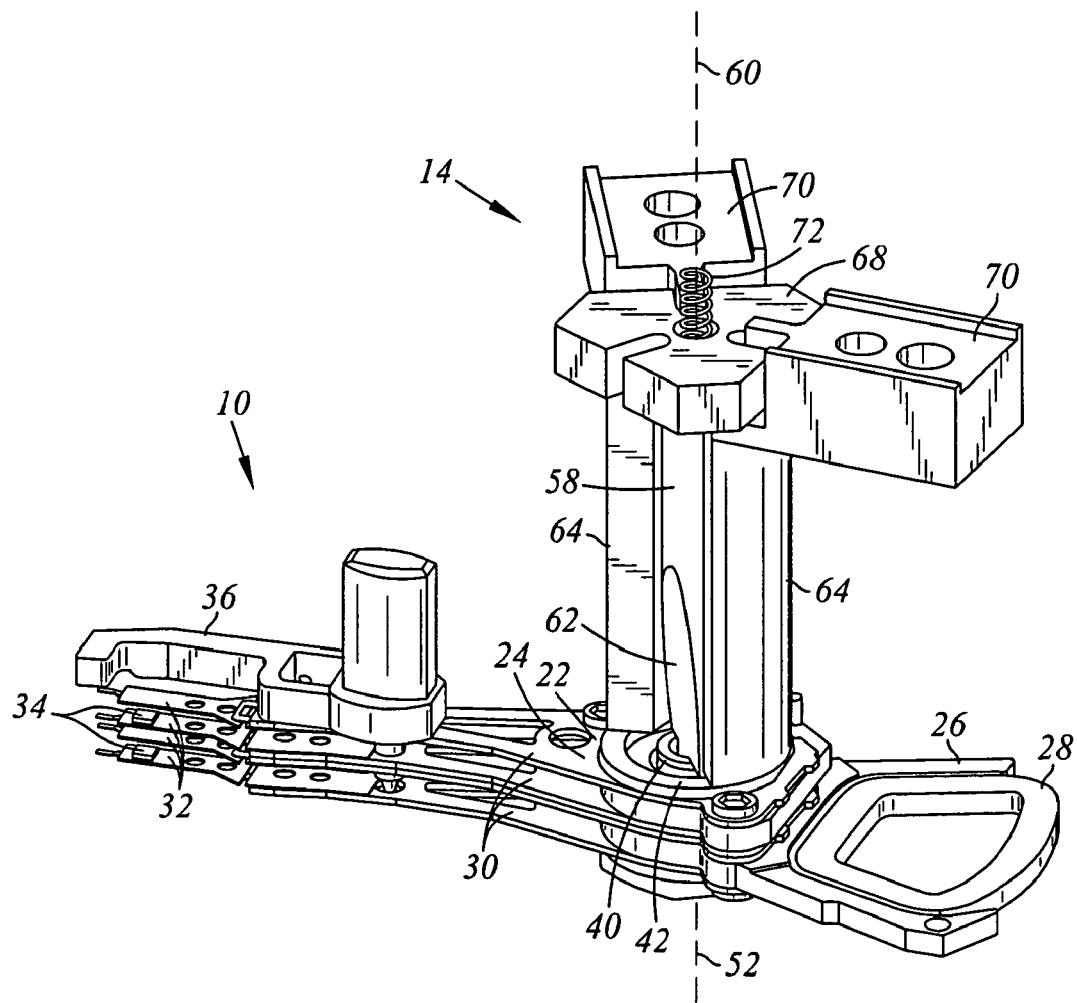
FIG. 3 is the perspective view of the head stack assembly and the tooling mandrel of FIG. 2, however, with the tooling mandrel with out one of its tooling fingers.

The head stack assembly 10 includes an actuator 22 with an actuator body 24. The actuator body 24 includes a bore and the pivot bearing cartridge 12 is engaged within the bore. A coil support 26 extends from one side of the actuator body 24, and a coil 28 is supported by the coil support 26. When installed in the disk drive, the coil 28 is configured to interact with one or more permanent magnets to form a voice coil motor. Energizing the coil 28 results in forces that tend to pivot the actuator 22. A change in the direction of current through the coil 28 results in a change in the resulting pivot direction. One or more actuator arms 30 extend from an opposite side of the actuator body 24. As can be seen, three are shown in this embodiment. Distally attached to the actuator arms 30 are head gimbal assemblies 32 (four are shown). Each head gimbal assembly 32 includes a transducer head 34 (only two can be seen in this view). As seen in FIGS. 1-3, the head stack assembly 10 is shown with a shipping comb 36 which is used to maintain separation the head gimbal assemblies 32 during transit and handling prior to installation in the disk drive.

Figure 7:
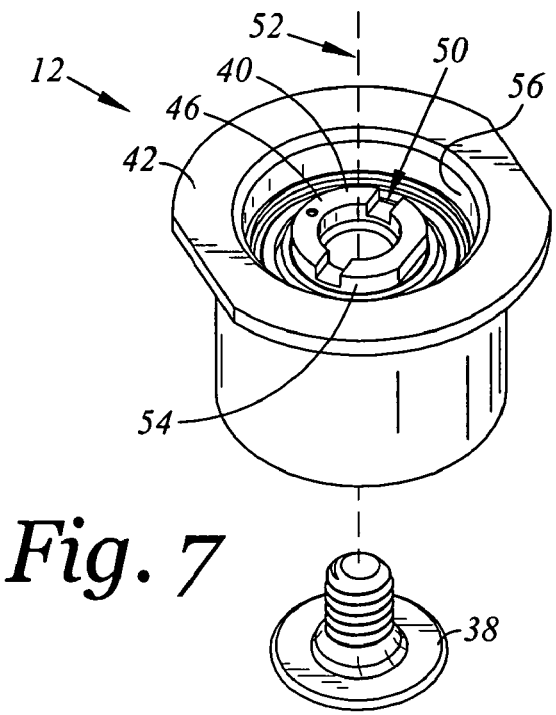
FIG. 7 is an top perspective view of the pivot bearing cartridge as shown with the fastener exploded from the pivot bearing cartridge.
Figure 8:
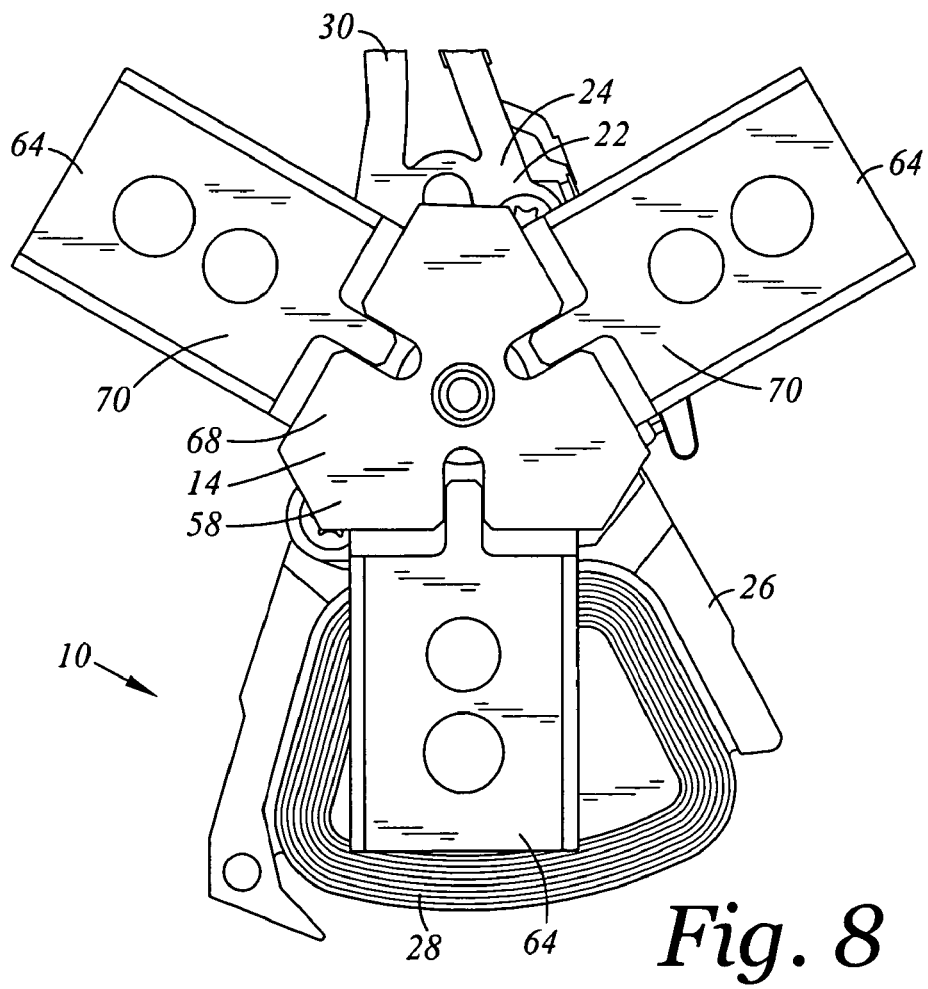
FIG. 8 is a top view of the tooling mandrel of FIG. 2 as shown with a portion of the head stack assembly.

As mentioned above, the head stack assembly 10 includes the pivot bearing cartridge 12. FIG. 7 is a top perspective view of the pivot bearing cartridge 12 as shown with the fastener 38 exploded from the pivot bearing cartridge 12. The pivot bearing cartridge 12 is shown in a cross-sectional view in FIGS. 4 and 5. The pivot bearing cartridge 12 includes a shaft 40 and a sleeve 42 disposed about the shaft 40. A bearing element is disposed between the shaft 40 and the sleeve 42. In the particular embodiment shown, the bearing element takes the form of a pair of bearing sets 44. Other bearing configurations are contemplated and may be chosen from those that are well known to one of ordinary skill in the art.

The shaft 40 includes a shaft first end 46 and an opposing shaft second end 48. The shaft first end 46 includes an engagement feature 50 (as best seen in FIG. 7). As discussed in detail below, the engagement feature 50 is engaged with the tooling mandrel 14. In the embodiment shown, the engagement feature 50 takes the form of a slot. Other configurations of the engagement feature 50 are contemplated, such as a torx configuration. Further, while the engagement feature 50 is shown to be engaged internally it may be externally engaged as well. The particular size and configuration of the engagement feature may be chosen from those that are well known to one of ordinary skill in the art.

The shaft second end 48 is disposed in mechanical communication with the disk drive base 16 when it is installed. This may be directly (as shown) or indirectly. In the embodiment shown, the fastener 38 is in the form of a screw and is used to attach the shaft second end 48 to the disk drive base 16. It is contemplated that the shaft second end 48 may be attached to the disk drive base 16 without the use of any fastener. For example, the shaft second end 48 may be press fit or adhesively bonded to the disk drive base 16.

The shaft 40 defines an axis of rotation 52. The actuator 22 and therefore the head stack assembly 10 are configured to rotate about the axis of rotation 52. The shaft 40 further defines a shaft outer circumferential surface 54. The sleeve 42 defines a sleeve inner circumferential surface 56 disposed towards the shaft outer circumferential surface 54.

According to an aspect of the present invention, there is the tooling mandrel 14 for use in assembling a disk drive. Referring additionally now to FIGS. 2-6 and 8, the tooling mandrel 14 includes a retainer element 58 defining a longitudinal axis 60 and including a distal end 62. The distal end 62 is sized and configured to engage the engagement feature 50 of the shaft first end 46 with the longitudinal axis 60 being aligned with the axis of rotation 52. The tooling mandrel 14 further includes at least two tooling fingers 64 disposed about the retainer element 58. In the embodiment shown, three tooling fingers 64 are depicted. The tooling fingers 64 are angularly fixed to the retainer element 58 with respect to the longitudinal axis 60. The tooling fingers 64 each include a tip portion 66. Each tip portion 66 is sized and configured to engage the pivot bearing cartridge 12 through cooperative radial movement with respect to the axis of rotation 52 with the distal end 62 of the retainer element 58 being engaged with the engagement feature 50 of the shaft first end 46.

The distal end 62 is sized and configured to engage the engagement feature 50 of the shaft first end 46. As mentioned above, the engagement feature 50 may take various forms. In this embodiment, the engagement feature 50 takes the form of a slot. In this regard, in the embodiment shown, the distal end 62 is flat-head screwdriver shaped.

The retainer element 58 may include a retainer base 68 disposed opposite of the distal end 62. Though not shown in detail it is contemplated that the retainer base 68 is attached to the remainder of the robotic armature 18.

As mentioned above, the tooling fingers 64 are angularly fixed to the retainer element 58 with respect to the longitudinal axis 60. In this regard, the tooling fingers 64 may each include a finger base 70. Each finger base 70 may be formed to interlock with the retainer base 68 as best seen in the top view of FIG. 8. In this regard, rotation of the retainer element 58 about the longitudinal axis 60 results in the retainer element 58 and the tooling fingers 64 moving substantially as one unit, although some degree of relative movement would be expected due to manufacturing tolerances between the two components.

As can be appreciated, the interlocking configuration of this embodiment of the retainer base 68 and the finger bases 70 facilitates movement of the tooling fingers 64 in a direction towards and away from the longitudinal axis 60. This allows the tip portions 66 to engage the pivot bearing cartridge 12. Additionally, the interlocking configuration of this embodiment of the retainer base 68 and the finger bases 70 facilitates movement of the tooling fingers 64 along the retainer element 58 with respect to the longitudinal axis 60 of the retainer element 58. In this regard, the retainer element 58 may be initially engaged with the shaft first end 46 and subsequently the tip portions 66 of the tooling fingers 64 may be positioned between the shaft 40 and the sleeve 42.

In the embodiment as shown in FIGS. 2-6, each tip portion of the 66 is sized and configured to engage the pivot bearing cartridge 12 through engagement of the sleeve inner circumferential surface 56 through cooperative radial movement away from the axis of rotation 52 with the distal end 62 of the retainer element 58 being engaged with the engagement feature 50 of the shaft first end 46. As such, the tip portions 66 collectively expand with respect to the shaft first end 46. Each tip portion 66 may move on the order of 0.5 to 1.0 mm, for example. FIG. 4 is a cross-sectional side view of the pivot bearing cartridge 12 as shown engaged with the tip portion 66. FIG. 6 is an enlarged view of a portion indicated in FIG. 4 of the tip portion 66 engaged with the sleeve inner circumferential surface 56 of the pivot bearing cartridge 12.

As mentioned above, the interlocking configuration of the retainer base 68 and the finger bases 70 facilitates movement of the tooling fingers 64 in a direction towards and away from the longitudinal axis 60. This may facilitate the tip portions 66 to move relative to the shaft first end 46. Though not shown, rather than the depicted translational movement, it is contemplated that the tooling fingers 64 may be configured to pivot from adjacent the retainer base 68 so as to result in movement of the tip portions 66.

As seen in FIGS. 3-5, the tooling mandrel 14 may further include a biasing element 72 in mechanical communication with the retainer element 58 for biasing the retainer element 58 in a direction along the longitudinal axis 60 towards the distal end. The biasing element 72 may be a spring such as shown.

Referring now to FIGS. 9-11 (which are similar view as those of FIGS. 4-6), there is depicted another embodiment of the tooling mandrel 14 with the differences noted. This embodiment features tooling fingers 74 each of which includes a tip portion 76. Each tip portion 76 is sized and configured to engage the pivot bearing cartridge 12 through engagement of the shaft outer circumferential surface 54 through cooperative radial movement towards the axis of rotation 52 with the distal end 62 of the retainer element 58 being engaged with the engagement feature 50 of the shaft first end 46. As such, the tip portions 76 collectively contract with respect to the shaft first end 46. The method includes the step of providing the tooling mandrel 14.

According to another embodiment, there is provided a method of assembling a disk drive. The method includes the initial step of providing the tooling mandrel 14. The method further includes a step of aligning the longitudinal axis 60 of the retainer element 58 with the axis of rotation 52 of the shaft 40. The method further includes a step of engaging the engagement feature 50 of the shaft first end 46 with the distal end 62 of the retainer element 58. The method further includes a step of engaging the pivot bearing cartridge 12 with the tooling fingers 64 through cooperative radial movement of the tip portions 66 with respect to the axis of rotation 52. The method further includes a step of positioning the pivot bearing cartridge in mechanical communication with the disk drive base 16 using the tooling fingers 64. The method further includes a step of attaching the pivot bearing cartridge 12 to the disk drive base 16 while maintaining engagement of the engagement feature 50 of the shaft first end 46 with the distal end 62 of the retainer element 58 and engagement of the pivot bearing cartridge 12 with the tooling fingers 64.

According to an embodiment as shown in FIGS. 2-6, the sleeve inner circumferential surface 56 is engaged with the tooling fingers 64 through cooperative radial movement of the tip portions 66 away from the axis of rotation 52. In another embodiment such as shown in FIGS. 9-11, the shaft outer circumferential surface 54 is engaged with the tooling fingers 64 through cooperative radial movement of the tip portions 76 towards the axis of rotation 52.

The method may include moving the tooling fingers 64 along the retainer element with respect to the longitudinal axis 60 of the retainer element 58 towards the shaft 40. The shaft 40 may be oriented at a predefined angle about the axis of rotation 52 with respect to the disk drive base 16 by using the tooling mandrel 14. This may include rotating the tooling mandrel 14 about the longitudinal axis 60 of the retainer element 58 until the shaft 40 is disposed at a predefined angle about the axis of rotation 52 with respect to the disk drive base 16. Such rotation may be performed prior to or after the pivot bearing cartridge 12 is disposed in mechanical communication with the disk drive base 16. As, the tooling mandrel 14 can perform "pick and place" operations with respect to the head stack assembly 10 as well as an orientation function with regard to the shaft 40.

Once the head stack assembly 10 is positioned in the disk drive base 16, the tooling mandrel 14 is further utilized to attach the pivot bearing cartridge 12 to the disk drive base 16. In this regard, engagement of the engagement feature 50 of the shaft first end 46 with the distal end 62 of the retainer element 58 and engagement of the pivot bearing cartridge 12 with the tooling fingers 64 are maintained during attachment. In this embodiment shown, the tool mandrel 14 is used to hold the shaft 40 and the sleeve 42 while the fastener 38 is disposed through the disk drive base 16 and into the shaft 40. As such, the tooling mandrel 14 of this embodiment is a single multi-purpose device used for "pick and place" operations, shaft orientation, and shaft-to-disk drive base attachment.

An orientation mark may be used for reference to determine the angle of the shaft 40 with respect to the predefined angle. The robotic armature 18 may include a vision system to detect such orientation mark and determine the shaft angle with respect to the predefined angle. This orientation mark may be a dot on the shaft first end 46 as in FIG. 7. The orientation mark may be an eccentric flat surface on the shaft outer circumferential surface 54 as in FIG. 7. While not illustrated, the orientation mark may also be an eccentric slot on the shaft first end 46.

We claim:

1. A method of assembling a disk drive, the disk drive including a disk drive base and a head stack assembly, the head stack assembly including a pivot bearing cartridge, the pivot bearing cartridge including a shaft and a sleeve disposed about the shaft, the shaft including a shaft first end with an engagement feature, the shaft defining an axis of rotation and a shaft outer circumferential surface, the sleeve defining a sleeve inner circumferential surface disposed towards the shaft outer circumferential surface, the method comprising:

a) providing a tooling mandrel, the tooling mandrel including:
   i) a retainer element defining a longitudinal axis and including a distal end, the distal end being sized and configured to engage the engagement feature of the shaft first end with the longitudinal axis being aligned with the axis of rotation; and
   ii) at least two tooling fingers disposed about the retainer element, the tooling fingers being angularly fixed to the retainer element with respect to the longitudinal axis, the tooling fingers each include a tip portion, each tip portion being sized and configured to engage the pivot bearing cartridge through cooperative radial movement with respect to the axis of rotation with the distal end of the retainer element being engaged with the engagement feature of the shaft first end;

b) aligning the longitudinal axis of the retainer element with the axis of rotation of the shaft;

c) engaging the engagement feature of the shaft first end with the distal end of the retainer element;

d) engaging the pivot bearing cartridge with the tooling fingers through cooperative radial movement of the tip portions with respect to the axis of rotation;

e) positioning the pivot bearing cartridge in mechanical communication with the disk drive base using the tooling fingers; and f) attaching the pivot bearing cartridge to the disk drive base while maintaining engagement of the engagement feature of the shaft first end with the distal end of the retainer element and engagement of the pivot bearing cartridge with the tooling fingers.

2. The method of claim 1 wherein step d) the sleeve inner circumferential surface is engaged with the tooling fingers through cooperative radial movement of the tip portions away from the axis of rotation.

3. The method of claim 1 wherein step d) the shaft outer circumferential surface is engaged with the tooling fingers through cooperative radial movement of the tip portions towards the axis of rotation.

4. The method of claim 1 wherein step d) includes moving the tooling fingers along the retainer element with respect to the longitudinal axis of the retainer element towards the shaft.

5. The method of claim 1 wherein step e) includes orienting the shaft at a predefined angle about the axis of rotation with respect to the disk drive base by using the tooling mandrel.

6. The method of claim 5 includes rotating the tooling mandrel about the longitudinal axis of the retainer element until the shaft is disposed at a predefined angle about the axis of rotation with respect to the disk drive base.

7. The method of claim 6 wherein the rotation of the tooling mandrel until the shaft is disposed at a predefined angle is performed while the pivot bearing cartridge is disposed in mechanical communication with the disk drive base.

8. The method of claim 6 wherein the rotation of the tooling mandrel until the shaft is disposed at a predefined angle is performed prior to the pivot bearing cartridge being disposed in mechanical communication with the disk drive base.

9. The method of claim 1 wherein the step f) includes using a fastener through the disk drive base to engage the shaft.

* * * * *